United States Patent
Leyerle et al.

(12)

(10) Patent No.: US 6,415,544 B1
(45) Date of Patent: Jul. 9, 2002

(54) RODENT TRAP WITH ENTRAPPING TEETH

(75) Inventors: Rick Leyerle, Madison; Scott J. Collins, Brown Deer; James R. Walsh, Wauwatosa; Daniel C. Johnson, Madison, all of WI (US)

(73) Assignee: Bell Laboratories, Inc., Madison, WI (US)

(*) Notice: Subject to any disclaimer, the term of this patent is extended or adjusted under 35 U.S.C. 154(b) by 0 days.

(21) Appl. No.: 09/560,362

(22) Filed: Apr. 28, 2000

(51) Int. Cl.[7] .................... A01M 23/24; A01M 23/26
(52) U.S. Cl. .................... 43/82; 43/83; 43/90
(58) Field of Search .................... 43/81, 81.5, 82, 43/83, 83.5, 88, 90, 92, 93

(56) References Cited

U.S. PATENT DOCUMENTS

| 1,080,623 | A | * | 12/1913 | Brorby | 43/88 |
| 1,123,410 | A | * | 1/1915 | Smith | 43/88 |
| 1,176,778 | A | * | 3/1916 | Rittelmann | 43/81 |
| 1,422,049 | A |   | 7/1922 | Gould |  |
| 1,630,241 | A |   | 5/1927 | Mountford |  |
| 1,877,264 | A | * | 9/1932 | Booth | 43/88 |
| 2,068,492 | A |   | 1/1937 | Johnson |  |
| 2,138,092 | A | * | 11/1938 | Evans | 43/83 |
| 2,174,929 | A | * | 10/1939 | Slutz | 43/83 |
| 2,525,010 | A |   | 10/1950 | Allison |  |
| 2,574,322 | A |   | 11/1951 | Fitzsimons |  |
| 2,724,209 | A |   | 11/1955 | Cain |  |
| 4,366,642 | A | * | 1/1983 | Gardner et al. | 43/82 |
| 4,578,893 | A | * | 4/1986 | Wickenberg | 43/81 |
| 4,665,644 | A | * | 5/1987 | Vajs et al. | 43/82 |
| 4,677,786 | A | * | 7/1987 | Frank | 43/82 |
| 4,803,799 | A | * | 2/1989 | Vajs et al. | 43/82 |
| 4,991,340 | A | * | 2/1991 | Schildt | 43/81 |
| D323,016 | S |   | 1/1992 | Vajs |  |
| 5,337,512 | A | * | 8/1994 | Krenzler | 43/82 |

FOREIGN PATENT DOCUMENTS

| EP | 280504 B1 | * | 8/1988 |  |
| FR | 800031 B1 | * | 6/1936 | 43/82 |

* cited by examiner

Primary Examiner—Darren W. Ark
(74) Attorney, Agent, or Firm—Lathrop & Clark LLP

(57) ABSTRACT

A plastic jaw or striker with downwardly facing teeth is pivotally mounted to a plastic base with mating upwardly facing teeth. A plastic trigger hangs from the base, and a coil spring extends between the jaw and the base rearward of the trigger. The spring holds the jaw in the set position, by engaging the rear of the jaw against the rear of the base. The trap is tuned to be not overly sensitive, avoiding springing of the trap by vibrations or insubstantial rodent entry. The spring or tension axis does not go through the trigger, simplifying construction and arrangement of parts. The open position is limited by the jaw engaging the base. The jaw is just over-center when set, such that a small movement towards closure does not trigger it. The trigger requires fairly large movement, facilitated by the raised pivot axis, to trigger the trap. When closed the teeth interdigitate, closing against each other without any shear, thus striking and crushing rodents caught between the teeth, but minimizing damage to children or pets inadvertently actuating the trap.

24 Claims, 4 Drawing Sheets

RODENT TRAP WITH ENTRAPPING TEETH

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

The present invention relates to rodent traps in general, and more particularly to traps employing a base, a jaw, a trigger, and a spring between the base and the jaw.

Bait containing rodenticide is widely used to control or eliminate rodent populations, however, there are circumstances where mechanical traps are desirable. Traps are useful within large structures or where water is available within a structure such that rodents which consume rodenticide are likely to die within the confines of a structure. Typically, rodenticide causes rodents to become thirsty before death, causing them to leave the typical home or building in search of water. If the rodents do not leave the structure before dying they often die in inaccessible locations. The decay of dead rodents will produce an undesirable stench within a building.

Mechanical traps also allow visual assessment of rodent population. Even where bait containing rodenticide is used, traps may be employed to monitor rodent population. Mechanical traps are also used where foodstuffs could be contaminated by rodenticide.

In homes where small children or pets are present, mechanical traps do not expose non-targeted animals and children to poison.

Mechanical traps, however, have liabilities. They may be constructed of sheet metal which tends to corrode. Corrosion may affect the reliable operation of a trap and will certainly limit its operating life, particularly in damp environments. Mechanical traps also can cut a rodent caught within the trap, causing bleeding which soils the trap and the structure surrounding the trap. Mechanical traps can also be difficult to set. A rodent trap requires a sensitive trigger which often means they are very sensitive to slight movements when being set, and sometimes will be accidently triggered when being positioned. Many mechanical traps also can become enmeshed with the trapped rodent, making discharge of the dead rodent from the trap difficult, thus complicating trap reuse. Where children or pets are present, any trap which will produce an open wound which may become infected is undesirable.

One class of traps typically made of sheet metal, but in some cases constructed of plastic, has four pieces: a base, a jaw pivotally mounted on the base, a trigger mounted on the base, and a coil spring extending between the base and the jaw. This type of trap may be arranged so that the trigger which moves the jaw a small amount and which brings the line of effort produced by the spring through the pivot center, causing the trap to close. Traps based on this basic form have been known since at least the patent to Evans, U.S. Pat. No. 2,138,092, issued in 1938. Traps of the Evans type combined simplicity with the absence of a trigger catchment or sere. This type of trap can often be manipulated externally by pivoting the jaw with respect to the base to release a dead rodent or to set the trap.

Although such traps are known, improvements in manufacturing simplicity, use of plastic materials, ease of operation, and reduction in too sharp edges remain desirable goals.

SUMMARY OF THE INVENTION

The rodent trap of this invention has three molded plastic parts: a base, a jaw pivotally mounted on the base, and a trigger mounted on the base. A coil spring extends between the base and the jaw. The base is substantially rectangular; however, the front portion has somewhat greater width than rear portion, and has rounded teeth which extend around three sides. Rearward of the teeth, the sides extend upwardly forming flanges which support small stub shafts which define a pivot axis. The upper jaw mounts to the stub shafts for pivotal movement about the pivot axis. The upper jaw has a forward portion having teeth that are opposed to and which interdigitate with the lower teeth. The jaw rocks on the pivot axis from a position where the jaw teeth engage the base teeth, to a position where a rearmost portion of the jaw engages a rearward portion of the base. A coil spring is connected between the forward portion of the jaw and a rearward portion of the base. The coil spring defines a tension axis which moves through the pivot axis as the upper jaw is pivoted on the base. The tension axis passes through the pivot axis shortly before the rearmost portion of the upper jaw comes to rest against the rearmost portion of the base.

A trigger is pivotally mounted to the side flanges of the base, forming a second pivot axis below and rearward of the first pivot axis. The trigger has a frontwardly extending tongue and a rearwardmost portion which engages against depending flanges which are integral with the upperjaw. When the trap is opened with a rearwardmost portion of the jaw engaging the rearwardmost portion of the base, the jaw flanges push against the rearwardmost portion of the trigger pivoting the tongue to a raised position. When a rodent pushes the tongue downward, the rearwardmost portion of the trigger rotates about the second axis, pushing against the flanges and causing the upper jaw to rotate about the first pivot axis, bringing the axis of tension below the first pivot axis and causing the teeth of the upper jaw to forcefully close against the teeth of the base.

It is an object of the present invention to provide a rodent trap that is easily set and easily opened to remove dead rodents.

It is another object of the present invention to provide a rodent trap which can be used many times.

It is a further object of the present invention to provide a rodent trap which can be set with one hand.

It is a still further object of the present invention to provide a mouse trap strong enough to kill a mouse yet not harm pets or children.

It is a yet further object of the present invention to provide a rodent trap which is not easily triggered accidentally by vibration.

Further objects, features and advantages of the invention will be apparent from the following detailed description when taken in conjunction with the accompanying drawings.

DESCRIPTION OF THE PREFERRED EMBODIMENTS

Figure 1:
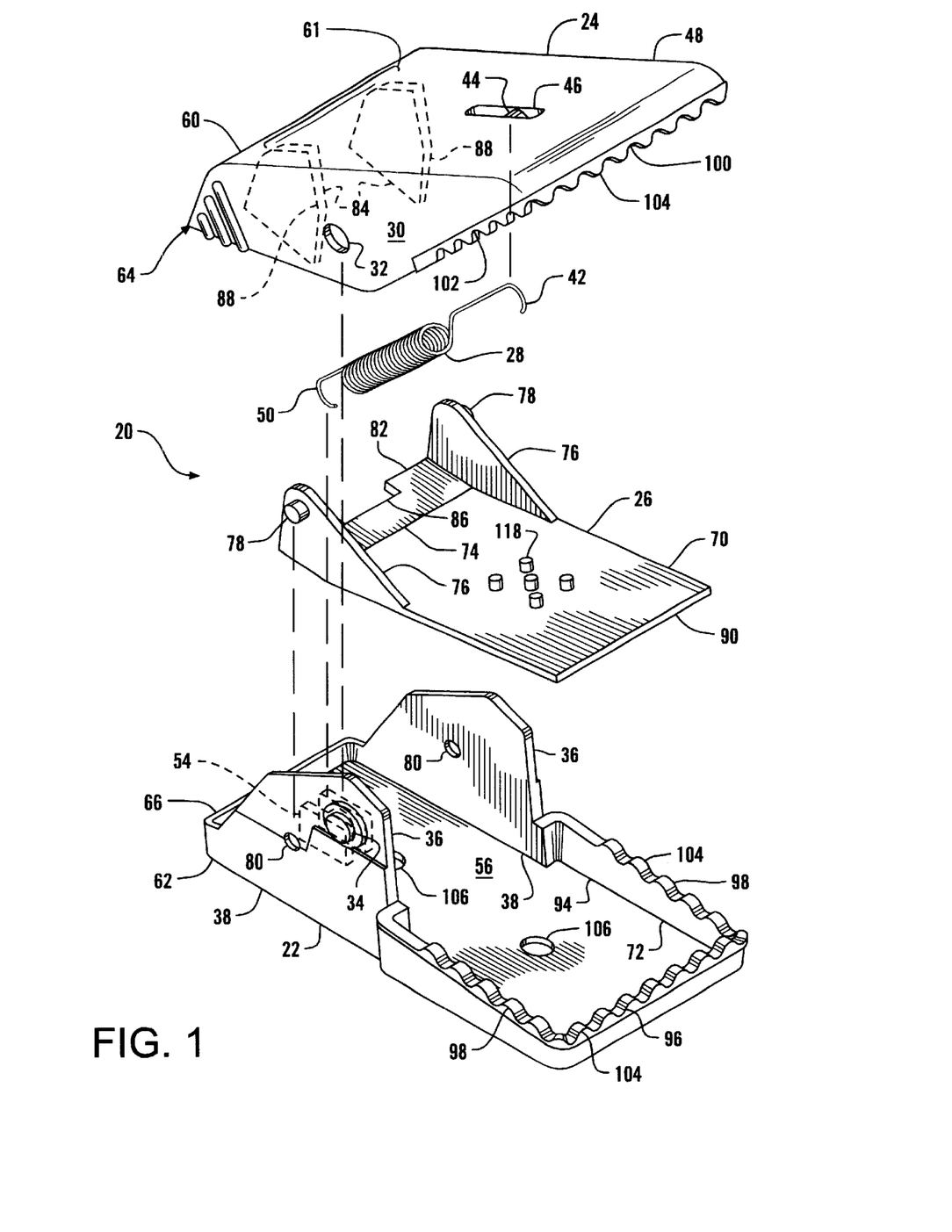
FIG. 1 is an exploded isometric view of the rodent trap of this invention.
Figure 2:
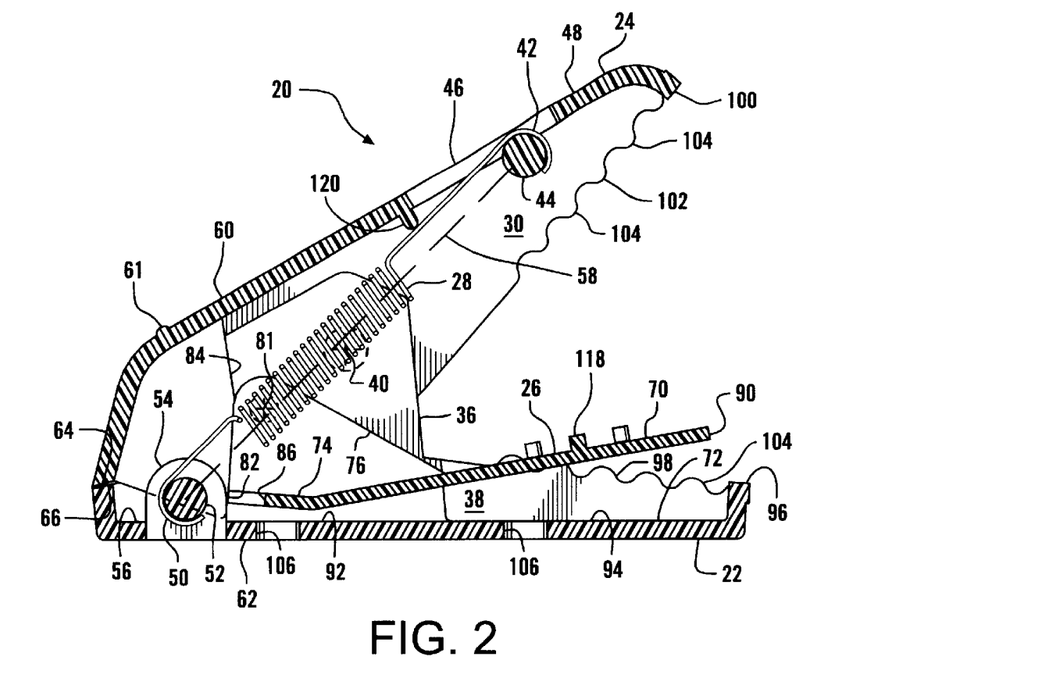
FIG. 2 is a cross-sectional view of the rodent trap of FIG. 1 shown in a set position.
Figure 3:
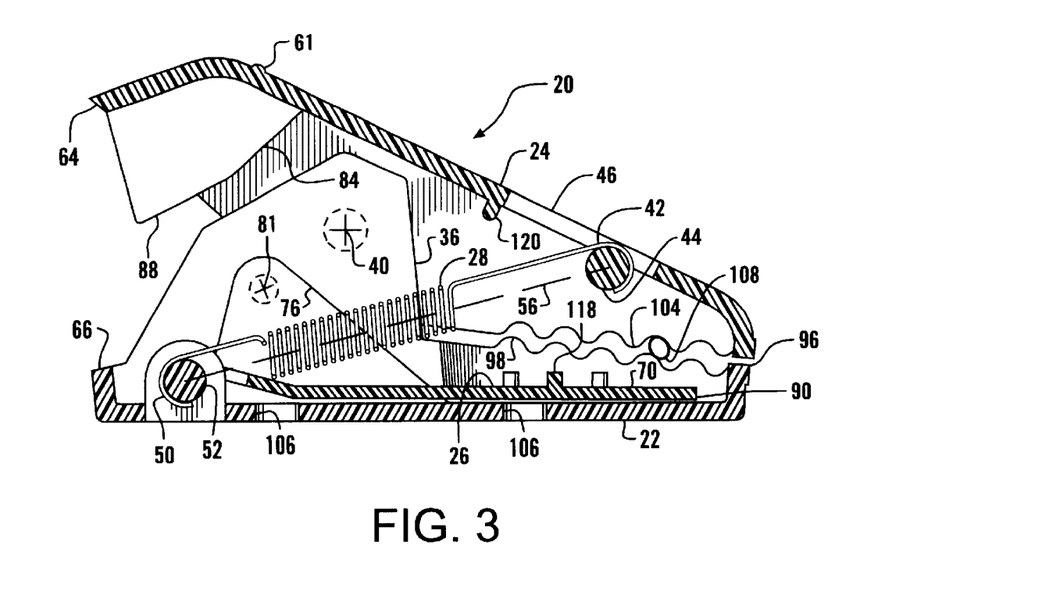
FIG. 3 is a cross-sectional view of the rodent trap of FIG. 2 closed upon the limb of a rodent.

Referring more particularly to FIGS. 1–5, wherein like numbers refer to similar parts, a rodent trap 20 is shown in FIGS. 2 and 3. The trap 20 has a plastic base 22 to which a plastic upper jaw or striker 24 is pivotally mounted. A plastic trigger 26 is also pivotally mounted to the base, and a coil spring 28 extends between the striker and the base. As shown in FIG. 1, the upper jaw 24 has spaced side walls 30 which define shaft engagement holes 32. The shaft engagement holes 32 ride on stub shafts 34 which project outwardly of flanges 36 which extend upwardly from the sides 38 of the base 22. The stub shafts 34 pivotally mount the upper jaw 24 about a horizontal first pivot axis 40.

A coil spring 28 has a first hook 42 which attaches the spring 28 to the upper jaw 24 by extending around a short shaft 44 mounted below a slot 46 in the forward portion 48 of the upper jaw 24. The coil spring 28 has a second hook 50 which attaches to the base 22 by engaging a short shaft 52 supported between two upstanding ears 54. The shaft 52 and the ears 54 are integrally formed with the bottom wall 56 of the base 22. The spring 28 defines an axis 58 through which the tension produced by the spring 28 acts. As the upper jaw 24 of the trap 20 moves from the open, set position shown in FIG. 2, to the closed position shown in FIG. 3, the axis of tension 58 moves through the first pivot axis 40. When the tension axis 58 is below the first pivot axis 40, energy stored in the spring 28 is transformed into kinetic energy of the rotating upper jaw 24 by the work the spring does as the trap 20 closes.

Figure 4:
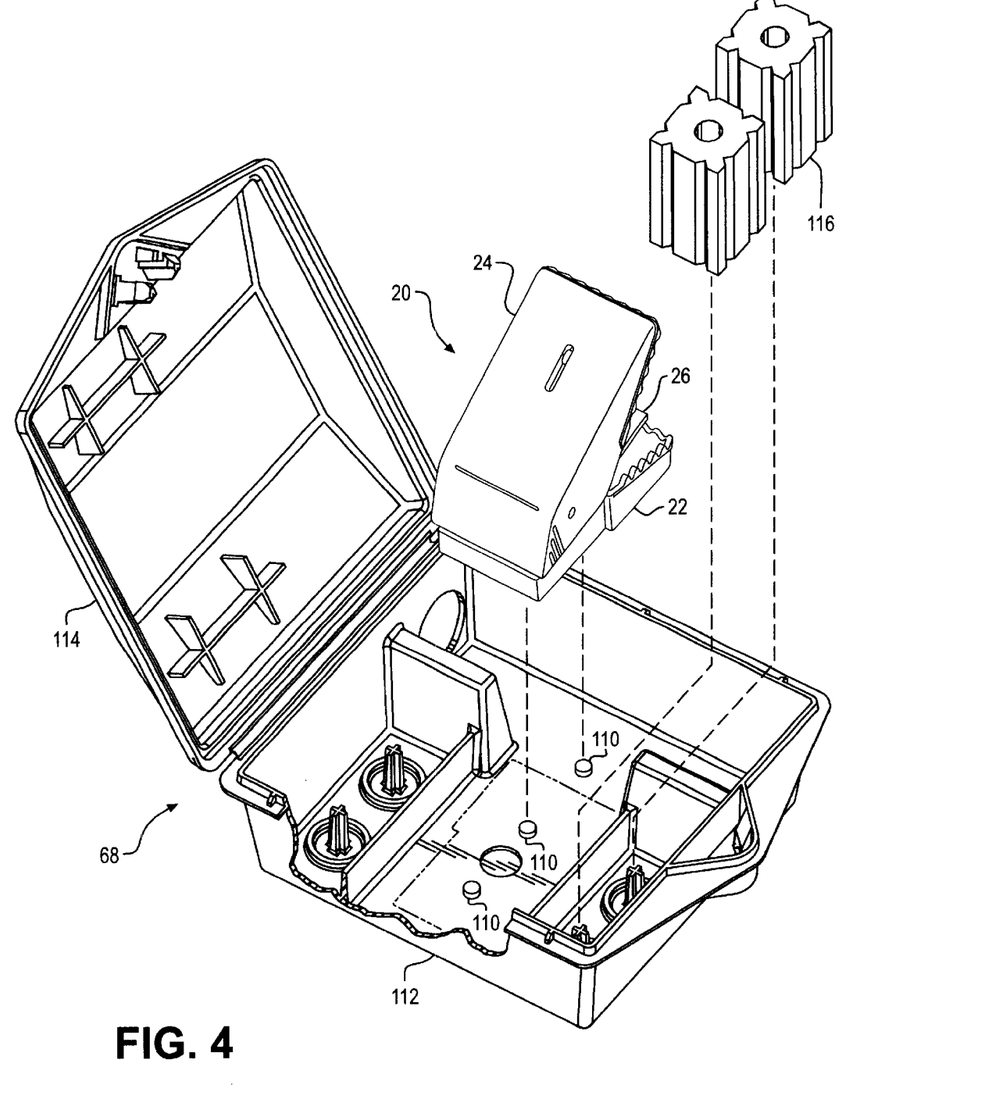
FIG. 4 is an exploded isometric view of the rodent trap of this invention with respect to a specially configured rodent bait station.

The trap is set, or a dead mouse is released from the trap, by simply pinching the rear portion 60 of the jaw 24 toward the rear portion 62 of the base 22 in a way analogous to opening a clothespin, until a rearwardmost downwardly facing surface 64 on the jaw 24 abuts an upwardly facing rearwardmost surface 66 on the base, as shown in FIG. 2. The rear portion 60 of the jaw 24 has an upwardly protruding horizontal ridge 61 which facilitates gripping the upper jaw. The axis of tension 58 is above the first axis of rotation 40 when the trap 20 is set. The jaw 24 is actually held open by the spring 28 and substantial rotation of the jaw 24 is required before the axis of tension is sufficiently past the axis of rotation to cause the trap 20 to begin closing. The surfaces 64, 66 may be moved apart about ¹⁄₁₆th of an inch before the spring 28 will pull the trap shut. This positioning of the tension axis above the axis of rotation and friction created by the stub shafts 34 rotating in the holes 32, prevents the trap from closing due to vibration or other small shocks. Resistance to premature closing due to shock or vibration allows the trap 20 to be set and then placed. This feature is particularly important when the trap is placed within a bait station 68, as shown in FIG. 4, where the bait station 68 is closed and then set in a position of use. Premature actuation of the trap 20 then requires unlocking the lid 114 from the base 112 of the bait station and resetting the trap. The bait station 68 is disclosed in the application entitled Bait Station With Interior Mechanical Rodent Trap, by applicants Rick Leyerle et al., filed on the same date as this application, and the disclosure of which is incorporation by reference herein. To facilitate positive positioning of the trap 20 within the bait station 68, the base of the trap may be provided with downwardly opening holes 106 which engage over protrusions 110 which extend upwardly from the bottom of the bait station. The bait station 68 may be of the type which alternatively holds rodent bait units 116.

In conventional mouse traps which employ two jaws connected by a coil spring, in which the spring moves over center of a pivot axis to close the trap, it is common for the trigger to extend between where the upper jaw comes together with the base, or to have a catchment which holds the upper jaw in place. This results in the trigger passing around or under the spring or spring mount and typically results in sensitivity to shock or vibration.

As shown in FIG. 1, the trigger 26 has a rectangular tongue 70 which extends forward within the forward portion 72 of the base 22. The tongue 70 is joined to a rear trigger plate 74 at an angle of about one-hundred and sixty degrees. Side flanges 76 extend upwardly from the rear trigger plate 74 and the tongue 70. An array of pins 118 may be molded on the tongue to aid in retaining bait on the tongue. Short stub shafts 78 extend sidewardly from the side flanges 76 and fit within holes 80 formed in the side walls 30 of the base 22. The stub shafts 78 define a trigger pivot axis 81. The rearmost edge 82 of the rear trigger plate 74 engages two interior jaw flanges 84 which extend downwardly from the rear portion 60 of the jaw 24. A small rearwardly opening recess 86 in the trigger plate 74 prevents the trigger 26 from engaging the ears 54 which support the spring engaging shaft 52.

In the set position, as shown in FIG. 2, the depending flanges 84 have nearly vertical edges 88 which engage with the rear edge 82 of the trigger plate 74 forcing it forward and thus causing the trigger 26 to pivot about an axis defined by the stub shafts 78, and raising the tongue 70 to the set position. The motion of the trigger plate rear edge 82 about the trigger pivot axis 81 is relatively large because the rear edge 82 is spaced a substantial distance below the pivot axis 81 and the motion against the flanges 84 is substantially tangent to the trigger plate's 74 rotation about the pivot axis 81. The motion of the trigger plate 74 is forcefully amplified because the lever arm, that is the distance from the trigger axis 81 to the tip 90 of the trigger tongue 70, is relatively large. The result of this trigger arrangement is that relatively light pressure by a rodent is required to depress the tongue 70 of the trigger plate 74 yet the rearmost edge 82 of the trigger plate moves strongly and a substantial distance against the flanges 84 mounted to the upper jaw 24. This means a rodent trap 20 can be at the same time easily triggered by a rodent and resistant to triggering by vibration and mild shock.

The design of the trigger 26 is such that no part of the trigger spring 28 is surrounded by the trigger. This simplifies assembling and reduces possibility of interference between the trigger 26 and the spring 28.

The base 22 has an overall rectangular shape which is made up of a rear rectangle 92 which includes the flanges 36 and the rear portion 62 of the base, and a forward rectangle 94 which is wider than the rear rectangle so that the front edge 96 and the two side edges 98 of the base are matched in width to the front edge 100 and side edges 102 of the upper jaw 24, so that the upper and lower edges meet when the trap is closed. Typically, in prior art traps, the jaws telescope one within the other, creating a cutting action between jaws, which although effective at killing mice, increases the inherent hazard to adults, children, and pets who may be cut by accidental engagement with such traps.

The trap 20 edges 96, 98, 100, 102 forming the teeth are relatively thick having wall thicknesses, where the teeth are formed, of approximately ¹⁄₁₀th of an inch. The teeth 104 are rounded, sinusoidal, interdigitate and are opposed. The spaces between teeth are formed by lower margins which are part of the rounded teeth. Opposed means that the teeth rest upon each other, while interdigitate means that the upper teeth fit between the lower teeth. The base 22 upper jaw 24 and the trigger 26 may be constructed of injection molded ABS plastic, which, together with the arrangement and shape of the teeth, results in a trap 20 that avoids shearing action which could cut or injure a pet or child. As shown in FIG. 3, a portion of a rodent such as a mouse 108 is crushed between the upper jaw and the base, without shearing. Shearing is prevented by the teeth 104 being opposed, i.e. upper and lower teeth not sliding past each other but biting down, the upper upon the lower. Moreover, the thickness of the teeth, approximately 1/10th of an inch, and teeth being constructed of plastic, results in crushing rather than shearing action.

It should be understood that for catching mice, an appropriate size for the trap 20 is about three inches along the length of the base. The spring should have an extension of 0.182 inches and a spring constant of about twenty-nine pounds per inch. For a mouse trap the teeth 104 should have valley to valley spacing of about 0.209 inches and a height of about 0.062 inches. The valleys between teeth being somewhat more rounded at a radius of 0.069 verses a radius of 0.049 for the peaks. Furthermore, as best shown in FIG. 1, base 22 front portion is three-sided, providing a front entry for rodents, and two rearwardly extending side entries for rodents, each of the front and side entries having upwardly protruding teeth. The upper jaw 24 forward portion has a front top array of teeth, and two rearwardly extending arrays of teeth. In the closed position, the upper jaw teeth are closed upon and interdigitated with the base teeth, with the upper jaw front array of teeth overlying the base front entry, and the upper jaw side arrays of teeth overlying the base side entries.

It should be understood that the sensitivity of the trap may be adjusted by slight changes in the position of the edges 88 of the flanges 84. This facilitates adjusting the injection mold used to manufacture the trap jaw to achieve desired sensitivity. Furthermore, the molds may be adjusted to elevate or decrease the upwardly facing rearwardmost surface 66 of the base, to adjust the preferred set position of the trap. In some circumstances, then, the upwardly facing rearwardmost surface 66 may be found on an upwardly protruding tab.

Figure 5:
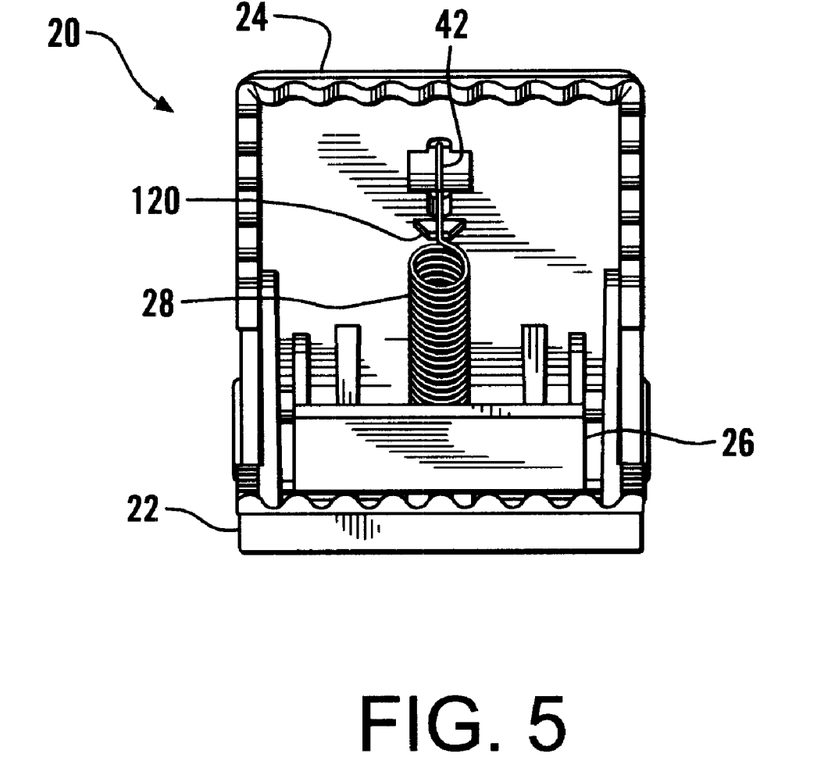
FIG. 5 is a front elevational view of the trap of FIG. 2.

In a preferred embodiment, the trap 20 is tuned to have a range of sensitivity most adapted to entrap the targeted rodent. A trap 20 which is overly sensitive may be actuated before the rodent has fully entered the trap, while a trap which is not sensitive enough may never close on the rodent. Due to friction and other factors, the spring 28 may not extend in a completely straight line from the first hook 42 to the second hook 50. If the spring 28 bows upwardly towardly the striker 24, the sensitivity is reduced, if it bows downwardly toward the base 22, sensitivity is increased. To prevent the loss of sensitivity from upward bowing, a bridge or tab 120 is formed in the underside of the striker, immediately rearward of the slot 46. As shown in FIGS. 2, 3 and 5, the tab 120 protrudes downwardly sufficiently to engage the spring 28 or the first hook of the spring, or to be closely spaced above the spring when the trap is in the set position. The tab 120 prevents undesired upward bowing of the spring.

It is understood that the invention is not limited to the particular construction and arrangement of parts herein illustrated and described, but embraces such modified forms thereof as come within the scope of the following claims.

We claim:

1. A plastic rodent trap having an upper jaw member and a lower base jaw member, the upper jaw member having integral parallel side flanges, the lower base jaw member having integral parallel side flanges, said side flanges of one of said jaw members having portions overlapping portions of the flanges of the other of said jaw members, the overlapping flange portions of one jaw member having openings therein and the flange portions of the other jaw member having integrally formed laterally extending extensions extending through said openings in the adjacent flange portions of the other jaw member to form a pivotal connection between the jaw members and defining a first pivot axis, a tension spring defining an axis of tension, the spring having a hook at one end of said spring, the hook engaging the upper jaw member and the other end of said spring having a hook which engages the lower base jaw member, the axis of tension being arranged to intersect the first pivot axis during movement of the jaw members between a set and a closed position, the improvement comprising:

when the trap is in the set position portions of the upper jaw member and portions of the lower base jaw member engaging to limit pivotal movement of the upper jaw member with respect to the lower base jaw member about the first pivot axis; and a trigger pivotally mounted about a second pivot axis to the base side flanges, the trigger having a plate portion bearing against at least one depending flange of the upper jaw which extends towards the first pivot axis when the trap is in a set position, the trigger having a tongue which extends frontwardly, wherein downward motion of the tongue causes the trigger plate portion to pivot about the second pivot axis, and causing the plate portion to bear against the at least one depending flange of the upper jaw member to cause the upper jaw member to move and the axis of tension to move through the first pivot axis.

2. The rodent trap of claim 1 wherein the tension axis does not pass through the trigger when the trap is in the set position.

3. The rodent trap of claim 1 wherein the upper and lower jaw members of the trap meet in the closed position to engage interdigitated opposed teeth.

4. The rodent trap of claim 3 wherein teeth on the upper jaw member extend around three sides of a rectangular part of the upper jaw member and wherein teeth on the lower jaw member extend around three sides of a rectangular part of the lower jaw member.

5. The rodent trap of claim 1 wherein the lower base jaw member is about three inches long, and the trap is scaled to catch mice.

6. The rodent trap of claim 1 wherein the base side flanges have the laterally extending extensions comprising stub shafts and the upper jaw member side flanges have the openings comprising holes, wherein the stub shafts fit within the holes.

7. The rodent trap of claim 1 further comprising a portion of the upper jaw member which defines a downwardly protruding tab which engages against one of said spring hooks in the set position to restrict upward bowing of the spring.

8. A plastic rodent trap having an upper jaw member and a lower base jaw member, the upper jaw member having integral parallel side flanges, the lower base jaw member having integral parallel side flanges, said side flanges of one of said jaw members having portions overlapping portions of the flanges of the other of said jaw members, the overlapping flange portions of one jaw member having openings therein and the flange portions of the other jaw member having integrally formed laterally extending extensions extending through said openings in the adjacent flange portions of the other jaw member to form a pivotal connection between the jaw members and defining a first pivot axis, a tension spring defining an axis of tension, the spring having a hook at one end of said spring, the hook engaging the upper jaw member and the other end of said spring having a hook which engages the lower base jaw member, the axis of tension being arranged to intersect the first pivot axis during movement of the jaw members between a set and a closed position, the improvement comprising:

when the trap is in the set position, portions of the upper jaw member and portions of the lower base jaw member engaging to limit pivotal movement of the upper jaw member with respect to the lower base jaw member; and     a trigger pivotally mounted about a second pivot axis to the base side flanges, the trigger having a plate portion bearing against depending portions of the upper jaw when the trap is in a set position, the trigger having a tongue which extends frontwardly, wherein downward motion of the tongue causes the trigger plate portion to pivot about the second pivot axis, and causing the plate portion to bear against the depending portions of the upper jaw member to cause the upper jaw member to move and the axis of tension to move through the first pivot axis, wherein the second pivot axis is located below the first pivot axis and rearwardly of the first pivot axis.

9. A plastic rodent trap having an upper jaw member and a lower base jaw member, the upper jaw member having integral parallel side flanges, the lower base jaw member having integral parallel side flanges, said side flanges of one of said jaw members having portions overlapping portions of the flanges of the other of said jaw members, the overlapping flange portions of one jaw member having openings therein and the flange portions of the other jaw member having integrally formed laterally extending extensions extending through said openings in the adjacent flange portions of the other jaw member to form a pivotal connection between the jaw members and defining a first pivot axis, a tension spring defining an axis of tension, the spring having a hook at one end of said spring, the hook engaging the upper jaw member and the other end of said spring having a hook which engages the lower base jaw member, the axis of tension being arranged to intersect the first pivot axis during movement of the jaw members between a set and a closed position, the improvement comprising:

when the trap is in the set position, portions of the upper jaw member and portions of the lower base jaw member engaging to limit pivotal movement of the upper jaw member with respect to the lower base jaw member; and     a trigger pivotally mounted about a second pivot axis to the base side flanges, the trigger having a plate portion bearing against depending portions of the upper jaw when the trap is in a set position, the trigger having a tongue which extends frontwardly, wherein downward motion of the tongue causes the trigger plate portion to pivot about the second pivot axis, and causing the plate portion to bear against the depending portions of the upper jaw member to cause the upper jaw member to move and the axis of tension to move through the first pivot axis, wherein the trigger tongue is joined to the trigger plate portion at an angle of about 160 degrees, and side flanges extend upwardly from the trigger plate portion and the tongue, the side flanges having outwardly extending stub shafts, the shafts rotating within portions of the base side flanges which define stub-shaft-receiving holes.

10. A rodent trap comprising:

a plastic base having a forward portion with a front edge and two rearwardly extending side edges, each of which has a plurality of upwardly protruding rounded teeth constructed of plastic, the base having a rear portion extending rearwardly of the forward portion, and two side flanges which extend upwardly from the rear portion, the base forward portion defining a front entry for rodents, and two rearwardly extending side entries for rodents above the side edges;

a plastic upper jaw having a forward portion with a plurality of downwardly protruding rounded teeth constructed of plastic, the upper jaw having a rear portion extending rearwardly of the upper jaw forward portion, the upper jaw rear portion having two downwardly extending side flanges, the downwardly extending side flanges of the upper jaw being pivotally mounted about a first pivot axis to the upwardly extending side flanges of the base, the upper jaw forward portion having a front portion and two rearwardly extending sides, the upper jaw forward portion front portion supporting some of the plurality of downwardly depending teeth, and each of the two rearwardly extending sides of the upper jaw forward portion supporting some of the plurality of downwardly depending rounded teeth arrayed in opposed position to the upwardly protruding teeth, the plurality of teeth on the sides of the upper jaw forward portion being opposed to the plurality of upwardly protruding teeth on the corresponding side edges of the base forward portion;

a spring extending between the base and the upper jaw, wherein the upper jaw travels between a set position, in which the upper jaw teeth are spaced from the base teeth, and a closed position, in which the upper jaw teeth are closed toward, rest upon and interdigitate with the base teeth, such that the upper jaw forward portion front portion plurality of teeth interdigitate with the base forward portion front edge plurality of teeth, and the plurality of teeth on the upper jaw forward portion sides interdigitate with the base side edge teeth at both side entries.

11. A rodent trap comprising:

a base having a forward portion and a rear portion extending rearwardly of the forward portion, and two side portions which extend upwardly from the rear portion;

an upper jaw having a forward portion and a rear portion extending rearwardly of the upper jaw forward portion, the upper jaw rear portion having two downwardly extending side portions, the downwardly extending side portions of the upper jaw being pivotally mounted about a first pivot axis to the upwardly extending side portions of the base;

a spring extending between a rear connection point on the rear portion of the base and a front connection point on the forward portion of the upper jaw, the spring defining an axis of tension, wherein the upper jaw travels between a set position, in which the axis of tension is positioned above the first pivot axis and a closed position, in which the axis of tension is below the first pivot axis;

a trigger having a tongue and two upwardly extending side flanges, the side flanges being pivotally mounted to the base side portions to rotate about a second pivot axis, the trigger tongue being spaced below the second pivot axis, the second pivot axis being positioned below and rearward of the first pivot axis and above and forward of the spring rear connection point, wherein downward rotation of the trigger causes the upper jaw to rotate about the first axis until the tension axis is positioned below the first axis, resulting in the trap closing.

12. The rodent trap of claim 11 wherein the upper jaw has a plurality of downwardly protruding teeth, and the base has a plurality of upwardly protruding teeth, and wherein the upper jaw and the base meet in the closed position to engage the upper jaw teeth with the base teeth such that the engaged teeth are interdigitated.

13. The rodent trap of claim 12 wherein the teeth on the upper jaw extend around three sides of a rectangular part of the upper jaw and wherein the teeth on the base extend around three sides of a rectangular part of the base.

14. A rodent trap comprising:

a base having a forward portion, a rear portion and upwardly extending side flanges;

an upper jaw having a forward portion, a rear portion and downwardly extending side flanges, the downwardly extending side flanges of the upper jaw being pivotally mounted about a first pivot axis to the upwardly extending side flanges of the base;

a coil spring extending between the rear portion of the base and the forward portion of the upper jaw, the coil spring defining an axis of tension;

the rear portion of the base engaging the rear portion of the upper jaw when the trap is in a set position, the tension axis being positioned above the first pivot axis in the set position;

a trigger pivotally mounted to the base side flanges about a second pivot axis below and rearward of the first pivot axis, the trigger having a frontwardly extending tongue which is mounted below the second pivot axis, and a rearwardly extending plate, the tension axis extending above the tongue when the trap is in the set position, the trigger plate abutting an interior jaw flange extending downwardly from the upper jaw when the trap is in the set position, the interior jaw flange engaging against the trigger plate to cause the trigger to rotate upwardly away from the forward portion of the base in the set position; and wherein when the tongue is urged downwardly towards the base, the trigger plate pushes against the interior jaw flange to cause the upper jaw to rotate about the first axis until the tension axis is positioned below the first axis, resulting in the trap closing.

15. The rodent trap of claim 14 further comprising a portion of the upper jaw which defines a downwardly protruding tab which engages against portions of the spring in the set position to restrict upward bowing of the spring.

16. The rodent trap of claim 14 wherein the upper jaw has a plurality of downwardly protruding teeth, and the base has a plurality of upwardly protruding teeth, and wherein the upper jaw and the base meet in the closed position to engage the upper jaw teeth with the base teeth such that the engaged teeth are interdigitated.

17. The rodent trap of claim 16 wherein the teeth on the upper jaw extend around three sides of a rectangular part of the upper jaw and wherein the teeth on the base extend around three sides of a rectangular part of the base.

18. The rodent trap of claim 14 wherein the base is about three inches long, and the trap is scaled to catch mice.

19. The rodent trap of claim 14 wherein the base side flanges have outwardly extending stub shafts which fit within holes defined by portions of the upper jaw downwardly depending side flanges.

20. The rodent trap of claim 14 wherein the trigger plate extends from the tongue at an angle of about 160 degrees, and wherein side flanges extend upwardly from the trigger plate and the tongue, the side flanges having outwardly extending stub shafts, and wherein the base side flanges have portions defining stub shaft receiving holes, into which the stub shafts extend.

21. The rodent trap of claim 14 wherein the tongue extends frontwardly from the trigger plate to substantially fill the forward portion of the base.

22. A rodent trap comprising:

a base having a forward portion, a rear portion extending rearwardly of the forward portion, and two side flanges which extend upwardly from the rear portion, the base forward portion defining a front entry for rodents, and two rearwardly extending side entries for rodents, each of the front and side entries having upwardly protruding teeth;

an upper jaw having a forward portion, a rear portion extending rearwardly of the upper jaw forward portion, the upper jaw rear portion having two downwardly extending side flanges, the downwardly extending side flanges of the upper jaw being pivotally mounted about a first pivot axis to the upwardly extending side flanges of the base, the upper jaw forward portion defining a front top array of teeth, and two rearwardly extending side arrays of teeth;

a spring extending between the rear portion of the base and the forward portion of the upper jaw, the spring defining an axis of tension; wherein the upper jaw travels between a set position, in which the axis of tension is positioned above the first pivot axis and the upper jaw teeth are spaced from the base teeth, and a closed position, in which the axis of tension is below the first pivot axis, and the upper jaw teeth are closed upon and interdigitated with the base teeth, with the upper jaw front array of teeth overlying the base front entry, and the upper jaw side arrays of teeth overlying the base side entries;

a trigger pivotally mounted to the base side flanges about a second pivot axis below and rearward of the first pivot axis, wherein downward rotation of the trigger causes the upper jaw to rotate about the first axis until the tension axis is positioned below the first axis, resulting in the trap closing.

23. The rodent trap of claim 18 further comprising a portion of the upper jaw which defines a downwardly protruding tab which engages against portions of the spring in the set position to restrict upward bowing of the spring.

24. A rodent trap comprising:

a base having a forward portion with a plurality of upwardly protruding teeth constructed of plastic having a thickness of about $\frac{1}{10}$th of an inch, the base having a rear portion extending rearwardly of the forward portion, and two side flanges which extend upwardly from the rear portion, the base forward portion defining a front entry for rodents, and two rearwardly extending side entries for rodents, each of the front and side entries having the upwardly protruding teeth;

an upper jaw having a forward portion with a plurality of downwardly protruding teeth constructed of plastic having a thickness of about $\frac{1}{10}$th of an inch, the upper jaw having a rear portion extending rearwardly of the upper jaw forward portion, the upper jaw rear portion having two downwardly extending side flanges, the downwardly extending side flanges of the upper jaw being pivotally mounted about a first pivot axis to the upwardly extending side flanges of the base, the upper jaw forward portion having a front portion and two rearwardly extending sides supporting the plurality of downwardly depending teeth arrayed in opposed position to the upwardly protruding teeth;

a spring extending between the rear portion of the base and the forward portion of the upper jaw, the spring defining an axis of tension; wherein the upper jaw travels between a set position, in which the axis of tension is positioned above the first pivot axis and the upper jaw teeth are spaced from the base teeth, and a closed position, in which the axis of tension is below the first pivot axis and the upper jaw teeth are closed toward, rest upon and interdigitate with the base teeth;

a trigger pivotally mounted to the base side flanges about a second pivot axis below and rearward of the first pivot axis, wherein downward rotation of the trigger causes the upper jaw to rotate about the first axis until the tension axis is positioned below the first axis, resulting in the trap closing.

* * * * *

UNITED STATES PATENT AND TRADEMARK OFFICE
CERTIFICATE OF CORRECTION

PATENT NO.    : 6,415,544 B1                                    Page 1 of 1
DATED         : July 9, 2002
INVENTOR(S)   : Leyerle et al.

It is certified that error appears in the above-identified patent and that said Letters Patent is hereby corrected as shown below:

Column 2,
Line 28, "upperjaw." should be -- upper jaw --

Column 5,
Line 30, "upperjaw" should be -- upper jaw --

Column 6,
Line 18, "positions portions" should be -- position, portions --

Column 10,
Line 51, "claim 18" should be -- claim 22 --

Signed and Sealed this

Twenty-sixth Day of November, 2002

Attest:

Attesting Officer

JAMES E. ROGAN
Director of the United States Patent and Trademark Office